United States Patent [19]
Eustis

[11] Patent Number: 5,664,899
[45] Date of Patent: Sep. 9, 1997

[54] FURNITURE JOINT

[76] Inventor: Robert H. Eustis, 862 Lathrop Dr., Stanford, Calif. 94305

[21] Appl. No.: 726,794

[22] Filed: Oct. 7, 1996

Related U.S. Application Data

[63] Continuation of Ser. No. 286,408, Aug. 5, 1994, abandoned, which is a continuation of Ser. No. 90,246, Jul. 9, 1993, abandoned, which is a continuation of Ser. No. 733,451, Jul. 22, 1991, abandoned.

[51] Int. Cl.$^6$ ................................................ F16B 12/04
[52] U.S. Cl. ...................... 403/268; 403/266; 403/292; 403/298
[58] Field of Search ..................... 403/256–260, 403/264–269, 230, 231, 205, 407.1, 403, 405.1, 406.1, 298, 292, 247, 295; 297/446, 447, 448, 449, 450

[56] References Cited

U.S. PATENT DOCUMENTS

| | | | |
|---|---|---|---|
| 250,137 | 11/1881 | Ellis | 403/260 |
| 569,235 | 10/1896 | Rockwell | 403/230 X |
| 752,669 | 2/1904 | Guzowski | 403/268 |
| 1,346,518 | 7/1920 | Waggoner | 403/258 X |
| 3,405,592 | 10/1968 | Blodee | 403/292 X |
| 3,501,199 | 3/1970 | Kapnek | 297/445 X |
| 3,835,610 | 9/1974 | Harper et al. | 403/231 X |
| 3,845,604 | 11/1974 | Ottosson | 403/231 X |
| 4,783,189 | 11/1988 | Bugg | 403/264 |
| 4,923,321 | 5/1990 | Kriz | 403/407.1 X |
| 4,944,627 | 7/1990 | Durney | 403/407.1 X |
| 4,981,388 | 1/1991 | Becken et al. | 403/258 |
| 5,033,904 | 7/1991 | Challis | 403/292 |
| 5,037,234 | 8/1991 | De Jong | 403/266 X |

FOREIGN PATENT DOCUMENTS

| | | | |
|---|---|---|---|
| 20993 | 2/1930 | Australia | 403/230 |
| 24045 | 7/1972 | Australia | 403/260 |
| 424103 | 1/1926 | Germany | 403/230 |
| 274856 | 1/1990 | Germany | 403/292 |
| 4019336 | 3/1991 | Germany | 403/295 |
| 283039 | 2/1931 | Italy | 297/446 |
| 16011 | 3/1927 | Netherlands | 403/258 |
| 99756 | 11/1961 | Netherlands | 297/446 |
| 17875 | 7/1908 | Norway | 297/446 |
| 320170 | 2/1970 | Sweden | 403/231 |
| 353884 | 6/1961 | Switzerland | 403/231 |
| 1534224 | 1/1990 | U.S.S.R. | 403/292 |
| 18323 | of 1894 | United Kingdom | 297/446 |
| 12304 | of 1913 | United Kingdom | 403/298 |
| 7529 | of 1913 | United Kingdom | 403/231 |
| 133203 | 10/1919 | United Kingdom | 403/259 |
| 191416 | 1/1923 | United Kingdom | 403/292 |
| 284488 | 2/1928 | United Kingdom | 403/231 |
| 918905 | 2/1963 | United Kingdom | 297/449 |

*Primary Examiner*—Harry C. Kim
*Attorney, Agent, or Firm*—Flehr Hohbach Test Albritton & Herbert LLP

[57] ABSTRACT

A joint for the seat side rail and rear leg or other furniture joint is disclosed. A bolt extends through a first bore forwardly through the leg and then through a second bore into the rear end of the rail. A tapped bar is inserted transversely into a pocket in the rail to receive the forward end of the bolt. The bolt is pre-stressed to put the joint under compression throughout. Preferably the bolt is bonded by adhesive to the first and second bores and the bar into its socket to form a composite of the leg, rail, bolt and bar. The joint is made superior to conventional dowelled joints by inserting in aligned bores extending into the rail and leg in opposite directions from the joint a metallic rod which is twice as long as the width of the rail and cementing the rod within the bores. The rod and/or bore may be roughened to promote adherence of the cement to the rod and wooden members.

7 Claims, 5 Drawing Sheets

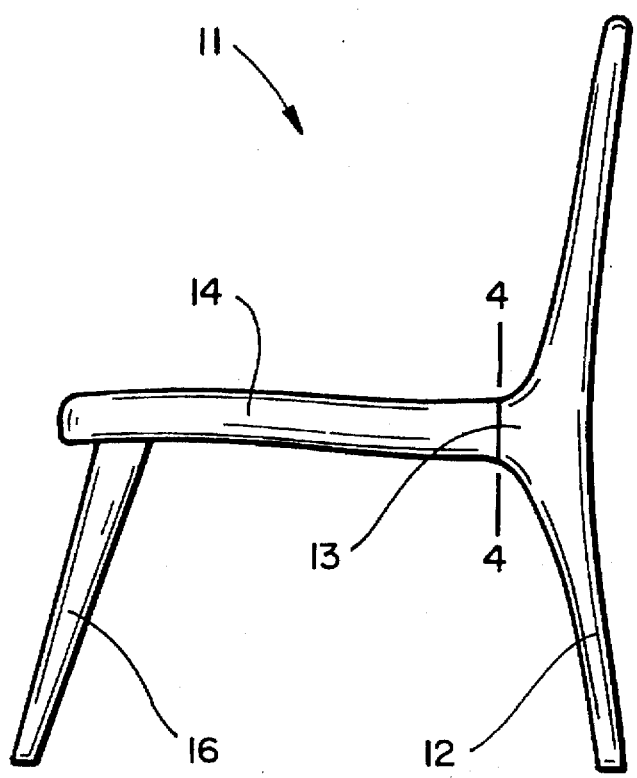
FIG_1
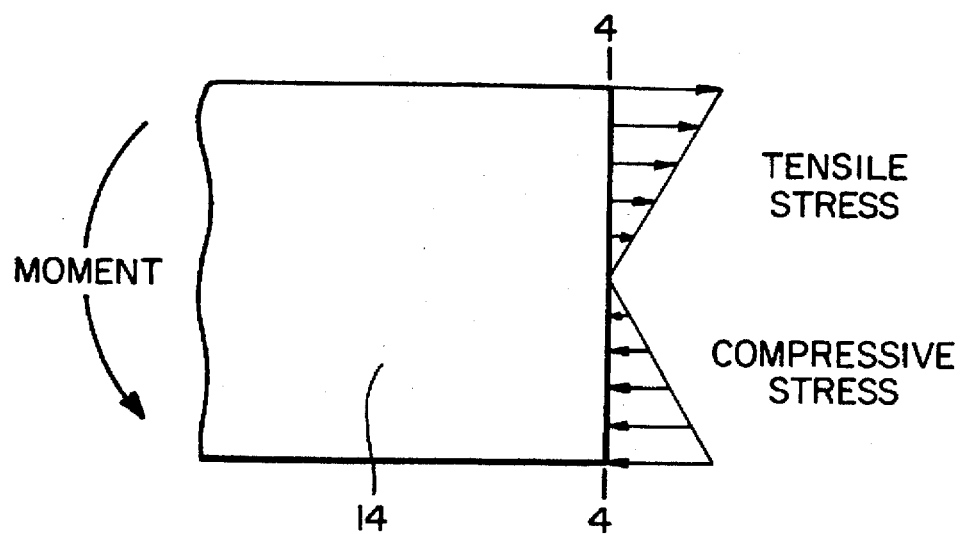
FIG_4

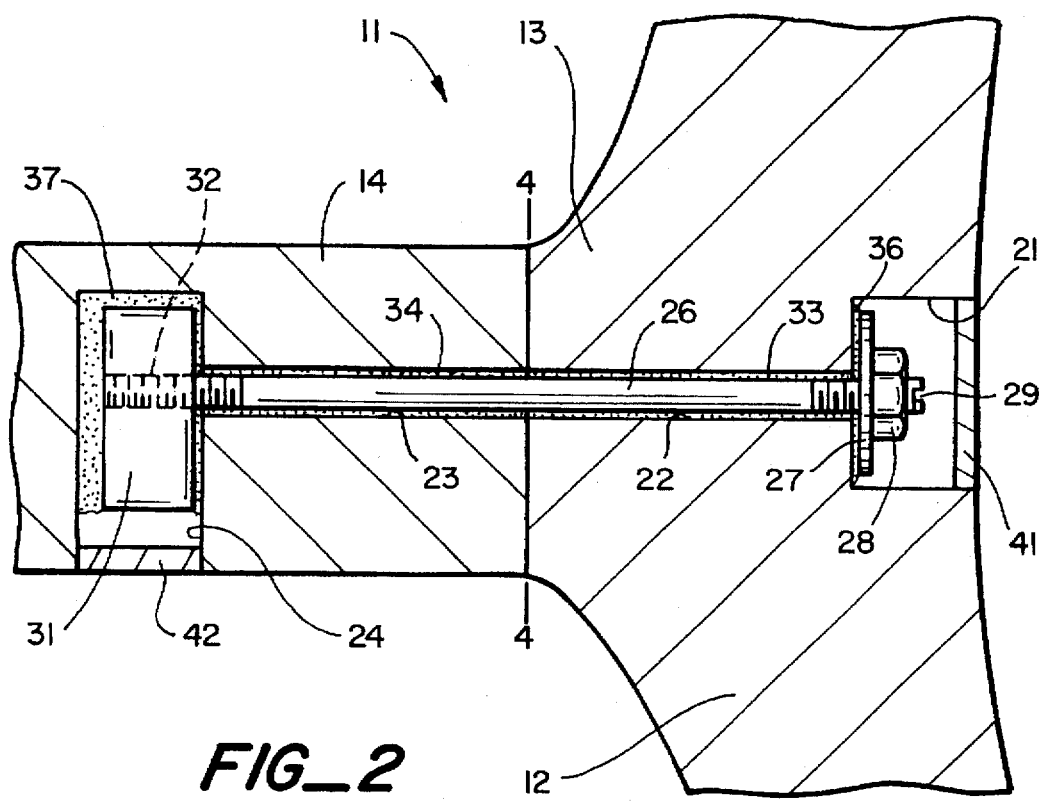
FIG_2
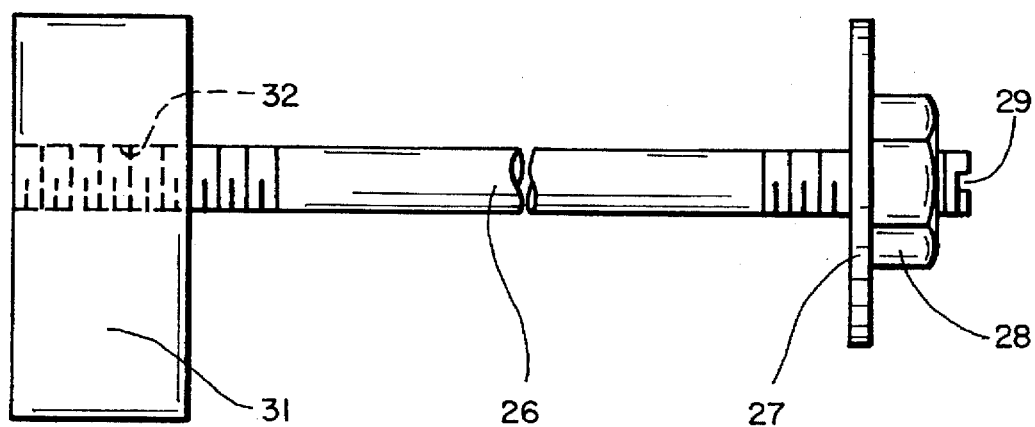
FIG_3

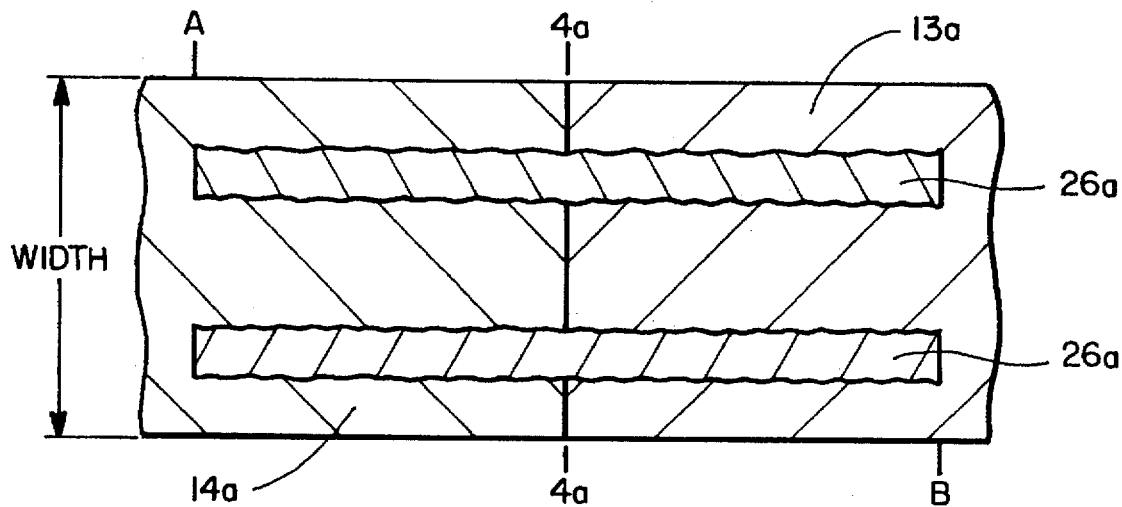
FIG_5
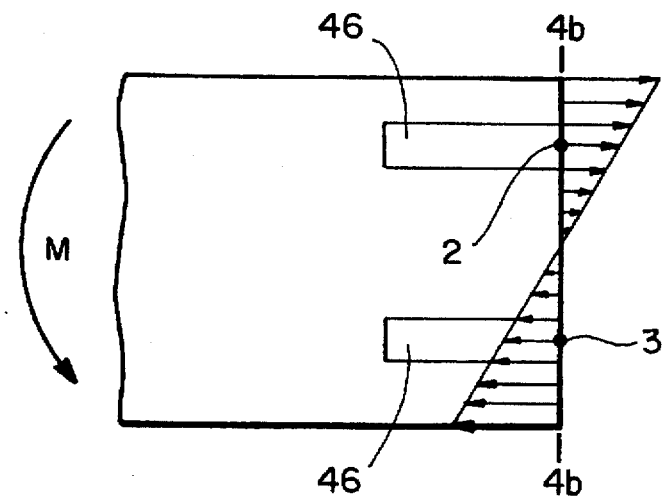
FIG_6
(PRIOR ART)

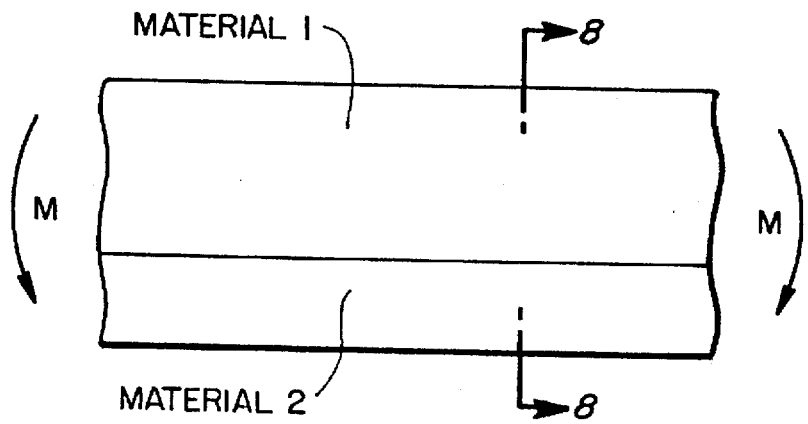
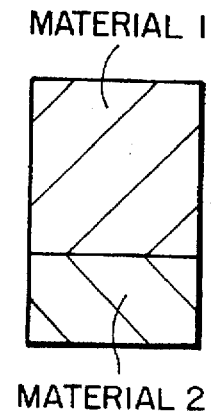
FIG_7    FIG_8
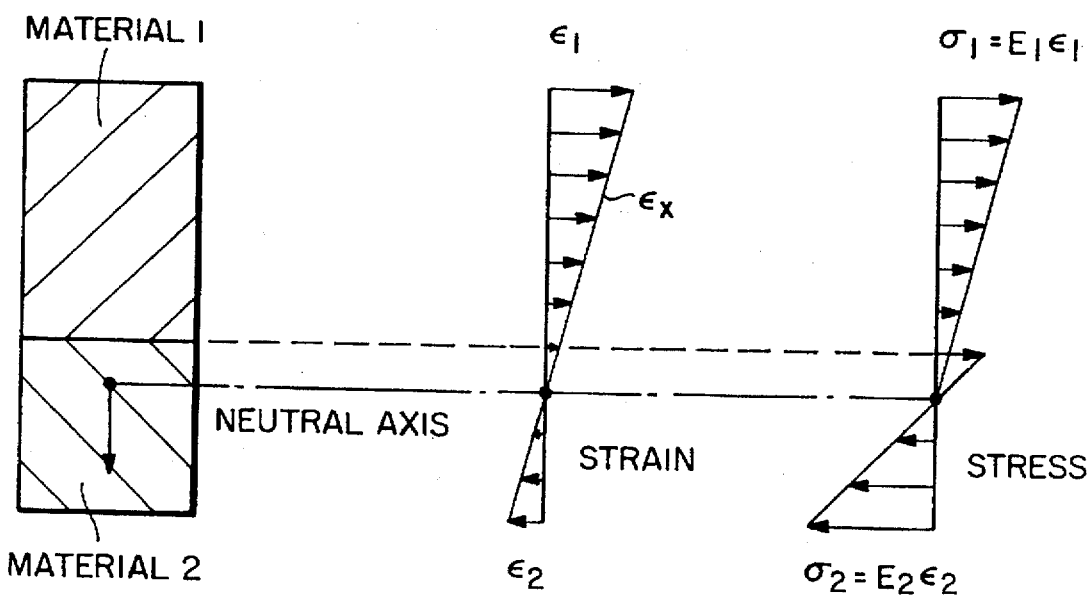
FIG_9    FIG_10    FIG_11

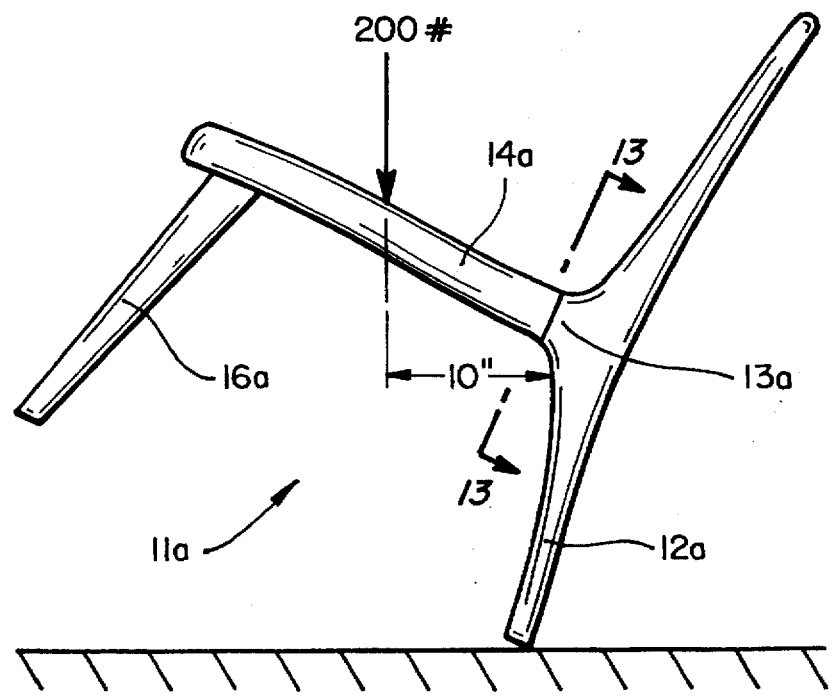
FIG_12
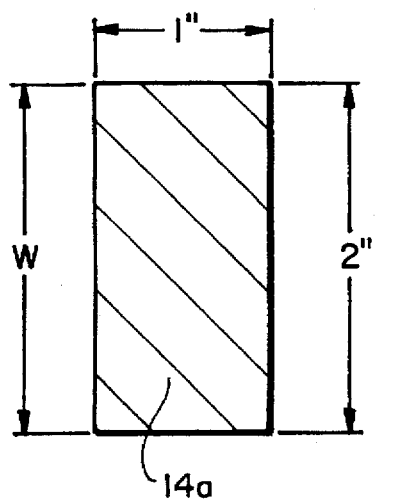
FIG_13
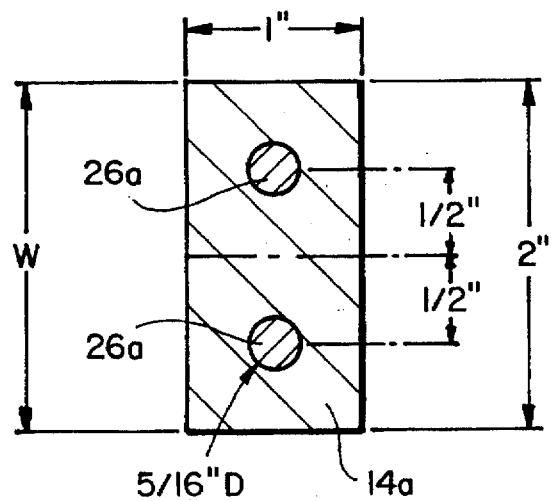
FIG_14

FURNITURE JOINT

This is a continuation of application Ser. No. 08/286,408, filed Aug. 5, 1994, now abandoned, which is a continuation of application Ser. No. 08/090,246, filed Jul. 9, 1993, now abandoned, which is a continuation of application Ser. No. 07/733,451, filed Jul. 22, 1991, now abandoned.

BACKGROUND OF THE INVENTION

1. Field of the Invention

This invention relates to a new and improved furniture joint and more particularly to a joint between a rear chair leg and a side seat rail characterized by the facts that the joint is fabricated to resemble a composite beam of wood and metal and the joint is pre-stressed so that it is under compression and that the stressing members are bonded to the wood of the chair to form a composite joint.

2. Description of Related Art

Furniture joints have traditionally been reinforced by means of dowel pins, mortise and tenon joints and screw fasteners as well as adhesives. However, such joints have traditionally failed when the joint is subjected to stress such as that caused when one tilts backward on a chair. Adhesives generally fail under tension during such stress, causing the joint to fail. This is particularly true for aged joints which have experienced cycling of moisture in the environment with concomitant swelling and contraction of the wood forming the joint. Dowels tend to fail at the glue interface and the wood holding the screws in place tears away. The present invention is an improvement over prior joints in that the joint is metal reinforced in such manner as to place the joint under compression. Further, the metal parts are bonded to the wooden parts by an adhesive to form a composite joint. Additionally, dowels are replaced by elongated, toughened metal rods which are inserted in holes in the joint and are caused to adhere to the wood by epoxy or other adhesive to form a composite beam of wood and metal.

SUMMARY OF THE INVENTION

An especially critical area in the design of chairs is the joint between the seat side rail and the back leg. This joint takes an exceptional load if the seated person tilts backward so that the seat is essentially cantilevered from the back leg. A glued joint at such location is usually strengthened by dowels, mortise and tenon construction or by screws. These techniques assist a butt joint, but failure is still common as the glue joint ages and the moisture content of the wood changes, and tilting puts large stresses on the glued surfaces.

Adhesives used in furniture construction are strong in compression and weak in tension and their shear strength is greatly affected by swelling or contracting of the wood due to moisture changes. Screws depend on the shear strength of the wood and this is usually only 20 to 40% of the wood's compressive and tensile strength, and the shear area for a screw is limited. The present invention alleviates the problem of joint failure by greatly relieving the tensile stress of the joint, so that even deteriorated adhesives can resist the resulting stress.

The invention has two parts—a device for pre-stressing the joint in compression and a means for providing for an effective composite beam structure. As hereinafter appears, when a chair is tilted back on the rear legs, a moment is applied to the joint resulting in a stress distribution wherein the maximum tensile stress is at the top of the joint and the maximum compressive stress at the bottom. A small shear load is also applied but this load is negligible. Hence, failure occurs in the area of tension and this is the common point of failure of conventional chairs.

One aspect of the present invention incorporates a bar which may be generally rectangular inserted into a seat side rail, the bar being threaded to receive one end of a threaded rod which is inserted into a bore extending through the joint and through the rear leg. A washer and nut are located in a counterbore formed in the rear leg and are threaded onto the second end of the rod. It will be understood that several rods may be used in parallel. Preferably epoxy or other adhesive is applied to the area under the washer and allowed to harden before the nut is tightened, reinforcing the fiber "tubes" in the wood, which otherwise crush under compression.

Upon assembly, the rail plug is inserted in the rail so that its rearward facing face is against the corresponding face of the socket formed in the rail. Preferably the faces of the plug and the socket are flat, but they may be made in other shapes, such as cylindrical. An end of the threaded rod is inserted through the counterbore and bore in the leg and thence into the tapped hole in the bar. Adhesive is applied to the bar, to the rod and to the washer, providing thorough contact between all components. The nut is tightened to provide a specified compressive pre-stress at the joint. Although wood is relatively weak in compressive strength perpendicular to the grain, impregnating the wood with epoxy and allowing the same to harden tends to alleviate crushing of wood fibers. Preferably there are two or more horizontal, vertically spaced rods.

Another feature of the invention is the formation of a "composite beam" extending through the seat rail—back leg joint. This structure may supplement the compression means heretofore described or, alternatively, may be used as a substitute therefor. Because wood has a modulus of elasticity about 1/20 that of steel, the wood joint can be made much stronger and the bending stress is greatly reduced by making the steel rod an integral part of the seat rail and back leg. In accordance with the present invention, this is accomplished by cementing the bolt or a separate rod to the rail and the back leg after the pre-load has been applied. In practice the inside of the bolt hole is larger than the bolt and its surface is threaded (as by using an enlarged tap) and then epoxy cement fills the spaces created, thus forming a mechanical bond as well as the normal physical-chemical bond between the wood and the steel. In the present invention the wood is cemented to the bolt along its length, thus augmenting the strength of the wood as contrasted with the usual application of a bolt which merely holds two surfaces together with glue at the surface interface.

The result of either of the above two features of the invention is that tensile strength due to bending of the joint can be greatly reduced compared to a joint without the mechanical device as shown and claimed herein. The stress is reduced to a level where adhesive will not fail and in many cases the tensile stress can be replaced by a compressive stress.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a side elevational view of a chair in accordance with the present invention.

FIG. 2 is an enlarged vertical sectional view through the joint.

FIG. 3 is a side elevational view of the metal components of the joint.

FIG. 4 is a schematic stress diagram showing the normal stress on the joint 4-4 of FIG. 1 when the person seated tilts the chair backward so that it is supported on its rear legs.

FIG. 5 is a vertical sectional view through a modified joint in accordance with a second aspect of the invention.

FIG. 6 is a stress diagram of a joint reinforced by conventional dowels.

FIG. 7 is a theoretical sectional view through a composite beam of materials 1 and 2.

FIG. 8 is a cross-section along line 8—8 of FIG. 7.

FIG. 9 shows the neutral axis z of FIG. 8.

FIG. 10 shows the strain curve at section 8—8.

FIG. 11 shows the stress curve at section 8—8.

FIG. 12 illustrates application of the composite beam aspect of the invention.

FIG. 13 is a sectional view along line 13—13 of FIG. 12.

FIG. 14 shows a structure similar to FIG. 13 using steel rods.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

In the aspect of the invention illustrated in FIGS. 1–3, a typical chair 11 has a rear leg which, in accordance with the present invention, has a truncated forward-extending boss 13. At the joint shown by 4—4, there is a butt joint with the rear edge of seat side rail 14. The forward end of the rail 14 is supported by front leg 16. It will be understood that the structure shown in FIG. 1 is duplicated on the opposite side of the chair.

When the user tilts backward so that the leg 16 is off the ground and all of the weight of the user is borne by the rear legs 12, as shown in FIG. 4, there is a turning moment. At the joint 4—4 it will be seen that this moment causes tensile stress in the upper part of the joint and compressive stress in the lower part of the joint. Adhesives commonly used in furniture construction fail under tension, causing the joint shown in FIG. 4 to fail. The object of the present invention is to reduce such failure.

Directing attention to FIGS. 2 and 3, a counterbore 21 is formed in the rear leg of the chair in alignment with the rail 14 and a toughened interior first bore 22 extends forwardly through the leg 12 and boss 13 in alignment with the rail 14 and preferably offset upwardly from the midpoint of the joint 4—4. A socket 24 is formed in the rail 14 preferably extending upward from the bottom surface of the rail 14 and preferably having a flat rearward face. A second bore 23 in alignment with the bore 22 extends into the socket 24. This bore also is roughened to promote the adherence of glue or cement thereto. Since wood is relatively weak in cross-grain compression because fiber "tubes" are easily crushed, it is desirable to impregnate the region at the bottom of counterbore 21 with a material which will diffuse into the wood, filling the "tubes" and hardening in place. A suitable material is the epoxy adhesive T-88 produced by Chem-Tech, Inc. Preferably the adhesive is heated to about 110° F. to reduce viscosity. Sufficient time is provided after application for the material to harden and cure.

Metal rod 26 preferably threaded at both ends and smaller in size than the bores 22 and 23 extends therethrough, also extending into the counterbore 21 and socket 24. A washer 27 preferably of enlarged diameter so as to bear against the base of the counterbore 21 and the hardened epoxy is slipped over the right-hand end of rod 26 as viewed in FIG. 2 and nut 28 is threaded onto the end of rod 26. A screwdriver slot 29 in the end of rod 26 permits it to be turned. Bar 31 having a flat surface which matches the flat surface of socket 24 is formed with a tapped hole 32. By inserting a screwdriver into slot 29 and turning the rod 26 it may be threaded into the bar 31. The nut 28 is tightened causing the members 12 and 14 to be drawn together and compressive force being applied throughout the joint 4—4. When stress is applied to the joint, by reason of the fact that the entire joint has been subjected to a compressive pre-stress, the tensile stress on the upper end of the joint 4—4 is overcome and hence the tendency to pull the glue apart is likewise overcome.

It will be noted as shown in FIG. 2 that the bores 22 and 23 are greater in diameter than the diameter of the rod 26 and, as has been stated, the walls of the bores 22 and 23 are roughened. Hence adhesive 33 placed in bore 22 and adhesive 34 placed in bore 23 bond the rod 26 to the members 12 and 14, respectively, forming a composite member. It is also apparent from FIG. 2 that the counterbore 21 is larger than and the washer 27 and the socket 24 is larger than the bar 31. Hence adhesive 36 applied in the counterbore 21 and adhesive 37 in the socket 24 bonds the washer 27 to the leg 12 and the bar 31 to the socket 24.

As has previously been stated, in appropriate situations, more than a single rod 26 may be used and all of the rods used may be threaded into a single bar 31. Indeed, in a preferred embodiment, two vertically spaced rods are used. For matters of appearance, closure plug 41 may be inserted to close off the outer end of the counterbore 21. Similarly, a closure plug 42 may be used to close off the outer end of the socket 24.

Turning now to a second aspect of the invention, a composite beam concept to provide a strong joint is illustrated in FIG. 5. Steel (or other metal) rods 26a, having toughened (e.g., threaded) surfaces extend through enlarged, roughened holes 23a bored on either side of the joint 4a—4a. The half-lengths of the steel rods 26a (i.e., on either side of joint 4a—4a) are greater than the width of the piece 14a. Precautions are taken to assure no slippage between the rods and the surrounding wood by roughening the rods 26a and holes 23a and filling the space with epoxy cement. Rods 26a may be circular or other cross-section. Strips of steel may also be used. The addition of steel to the wood reduces the bending stress at any point between A and B including the plane 4a—4a of the joint.

Although the configuration of FIG. 5 appears at first glance to be substitution of a steel for a wood dowel inserted into the wood, nevertheless the rods 26a are used for very different purposes. The action of a dowel is to provide resistance at the joint as illustrated in FIG. 6.

The moment, M, (possibly due to someone tilting back in a chair) is restrained by the stress distribution shown for wood dowels 46. The stress at point 2 may exceed the tensile strength of the glue but the allowable stress in the dowel 46 at point 2 is much higher than the allowable tensile stress in the glue. Therefore the dowel reinforces the joint. It acts as a strong region in the joint and its virtue is due to the greater tensile strength of the wood compared to the glue.

Joyce (*Encyclopedia of Furniture Making*, Sterling Publishing Co., 1987, p. 167), in comparing spiral-grooved, fluted and straight dowel pegs, says, "Providing the dowels are a good fit and enter not less than 1¼ in. (32 mm) either side of the joint-line there is probably little difference in the ultimate strength." Again, Joyce (ibid., p. 169) says, "[I]t is usually reckoned that dowel pins should enter about 1¼ in. (32 mm) for maximum efficiency . . . ." Thus one would expect the practice to be for dowel lengths of approximately 2½ in. in length.

R. J. DeCristoforo (*Woodworking Techniques: Joints and Their Application*, Reston Publishing Co., 1979, p. 21) recommends dowels somewhat shorter in a table of typical sizes (page 21):

| Diameter | Length |
| --- | --- |
| 1/4" | 1-1/2" |
| 3/8" | 1-1/2–2" |
| 7/16" | 2" |
| 1/2" | 2" |

For stock of usual thickness, DeCristoforo indicated a length of twice the stock thickness (not width).

The length of dowels used in practice can also be seen from the dowels offered to the trade by suppliers. Typical dowel assortments (for say 1000 dowels) are the following:

1) Leichtung Workshop Catalog, Early Spring, 1991, p. 72:

1/4" × 1 1/4" long      5/16" × 1 1/2" long
   1/4" × 1 1/2" long      3/8" × 1 1/2" long
                           1/2" × 1 1/2" long 2) The Woodworkers' Store, 1990–91 Catalog, p. 1: Dowel assortment kit—all less than 2"long. On p. 7, hard maple dowels, 2½" is largest.
3) Woodcraft 1990–91 Catalog, p. 85:
   Max. length in assortment is 2½".
4) Trend-lines Catalog, Winter, 1990–91, p. 32:
   Assortment including:
   ¼"×1¼" long,
   5/16", 3/8" ½"×1½" long.

Applicant has found no offering of steel dowels and no mention of steel dowels was found in Joyce (op. cit.) or DeCristoforo (op. cit.) Because dowels are used for their greater tensile strength compared to glue, it would be expected that the length would be similar to wood dowels in the rare instances that they would be used.

Returning now to the composite beam joint and FIG. 5, the steel inserts are not simply dowels of unnecessarily great length. The action of the inserts is to stiffen the beam and thereby decrease the stress in the beam and in the joint induced by an external force or moment.

The ideal joint design for a beam would be one which is transparent to the beam, i.e., one which has no negative effect on the beam and which can sustain continuously any stress likely to be imposed on the beam. The composite beam joint approaches this ideal design to a good approximation. To illustrate the performance of the composite beam joint, it will be assumed that the beam is continuous, i.e., that the joint does not degrade the performance of the beam. The stress in such a beam can be reduced to the point where the joint adhesive will not fail. This satisfies the condition of the assumption.

The fundamental concept of stress analysis for beams in bending is that the cross-sections of the beam which were planar before bending remain planar after bending (Gere and Timoshenko, *Mechanics of Materials*, 2nd Ed., Brooks/Cole Division of Wadsworth, Inc., 1984, pp. 208, 249). This results from arguments of symmetry and has been verified by careful experimental measurements conducted by others. FIG. 7 illustrates a beam made of two materials 1 and 2, and in FIG. 10 the strain curve at a cross-section through such a beam. The bending stress, $\sigma_x$, is also shown in FIG. 11.

The location of the neutral axis is found from the equilibrium condition that the net axial force on a cross-section is zero:

$$\int_1 \sigma_{x1} dA_1 + \int_2 \sigma_{x2} dA_2 = 0$$

Then for y measured from the neutral axis, the moment:

$$M = \int_1 \sigma_{x1} y dA_1 + \int_2 \sigma_{x2} y dA_2$$

and using $\sigma = E\epsilon$ and the fact that the strain curve $\epsilon$ (y) is a straight line:

$$\sigma_{x1} = \frac{MyE_1}{E_1 I_1 + E_2 I_2} \; ; \; \sigma_{x2} = \frac{MyE_2}{E_1 I_1 + E_2 I_2}$$

where:

$$I_1 = \int_1 y^2 dA; \; I_2 = \int_2 y^2 dA$$

again with y measured from the neutral axis. (I being the moment of inertia.)

In a specialized case of wood (say material 1) and steel (material 2), for the simple case of symmetry, FIG. 11, the maximum stress occurs when y=h/2 and:

$$\sigma_{wood,max} = \frac{M \frac{h}{2} E_1}{E_1 I_1 + 20 E_1 I_2}$$

for $E_{steel} = 20 E_{wood}$. For $I_1$ and $I_2$ comparable in size, we see that the maximum stress is greatly reduced by the quantity 20 in the denominator. Thus, the addition of steel to a wood beam to form a composite may reduce the stress to a level easily achieved by quality adhesives.

The present invention in its second aspect is the formation of a composite beam with wood reinforced by a material of larger modulus of elasticity, E. Typical values are:

$E_{aluminum} = 10-11 \times 10^6$ psi $E_{brass} = 14-16 \times 10^6$ psi $E_{concrete} 4 \times 10^6$ psi (compression)

$E_{steel} 30 \times 10^6$ psi $E_{titanium} 16 \times 10^6$ psi

For a beam to be a "composite beam" as intended in the present invention, the cross-section must remain plane when bending occurs. This requires an insert or rod 26a long enough on each side of the joint to be away from "end-effects". In practice, this means the insert is about equal to or greater than the width (not thickness) or height of the beam on each side of the joint. For a chair rail this would typically be greater than 4–6" long.

A typical dowel 46 is 1½ to 2½ inches long and a wood dowel would have no function in a composite wood beam.

A steel dowel 1½ to 2½ inches long could not be treated with the planar assumption of beam bending theory because there would be end effects causing local distortions.

For any composite beam to function properly, there can be no slippage between the two materials. Thus, the present invention preferably uses threaded steel rods 26a cemented along their entire length into toughened holes in the wood.

An illustration of the efficacy of a composite beam is now illustrated for the case shown in FIG. 12.

Each "side rail-back leg" joint carries a moment of 1000 in-lb (and a shear load which is negligible). The maximum bending stress in the joint is 1500 psi which is sufficient to break the joint if the glue has deteriorated due to aging. If two 5/16 inch threaded rods 26a are used as shown in FIG. 12 and FIG. 14, the stress is reduced to 714 psi. Thus, an improvement of greater than two times is achieved. If the steel rods 26a are placed further from neutral axis, the effect is even greater.

If the joint is pre-stressed compressively and the rods act to provide a composite beam. The maximum tensile stress in the joint 4—4 due to the load in FIG. 2 is reduced to about 300 psi, depending on the torque applied to the nuts 28.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A high strength joint assembly comprising:

first and second wooden members having a length dimension, a thickness dimension, and a width dimension greater than said thickness dimension, said first wooden member having a first surface and said second wooden member having a second surface opposite said first surface, said wooden members each having at least two spaced, inwardly extending wells formed therein, said wells of one of said wooden members being substantially aligned with said wells of the other of said wooden members to define at least two spaced, elongated bores extending into said wooden members, said wells of at least one of said wooden members being substantially parallel to the longitudinal axis of said at least one of said wooden members, a solid metallic rod positioned in each of said bores, said rods each having a first length positioned in said wells of one of said wooden members and a second length positioned in said wells of the other of said wooden members, at least one of said first length and said second length being at least substantially as long as said width dimension of said one of said wooden members, a first adhesive substantially filling said bores, said first adhesive extending along said first length and said second length to bond the entire length of said rods to said wooden members to securely fasten said rods to said wooden members and prevent slippage of said rods relative to said wooden members and movement of each of said wooden members relative to the other wooden member, and said rods, said wooden members proximate said rods, and said first adhesive forming a composite beam extending through said joint assembly, said composite beam securing said wooden members together and stiffening said wooden members to reduce tensile stresses in said wooden members when a bending moment is applied to said wooden members, said composite beam having a neutral axis where the net axial force due to bending on a cross section of said composite beam transverse to the longitudinal axis of said composite beam is zero, at least one of said rods being offset from said neutral axis in the direction of said width dimension to reduce tensile stresses in said wooden members when said bending moment is applied to said wooden members.

2. A joint assembly according to claim 1 in which said rods are roughened to promote adherence of said first adhesive to said rods.

3. A joint assembly according to claim 2 in which said bores have roughened walls to promote adherence of said first adhesive to said wooden members.

4. A joint assembly according to claim 1 in which said rods are substantially vertically aligned.

5. A joint assembly according to claim 1 in which said rods are steel.

6. A joint assembly according to claim 1 in which said first length and said second length are at least as long as said width dimension.

7. The joint assembly of claim 1, and further comprising a second adhesive between said first and second surfaces reinforcing and securing together said surfaces of said wooden members.

* * * * *

UNITED STATES PATENT AND TRADEMARK OFFICE
CERTIFICATE OF CORRECTION

PATENT NO.   : 5,664,899
DATED        : September 9, 1997
INVENTOR(S)  : Eustis

It is certified that error appears in the above-identified patent and that said Letters Patent is hereby corrected as shown below:

Column 2,
Line 51, delete "strength" and replace with --stress--.

Column 3,
Line 56, delete "toughened" and replace with --roughened--.

Column 4,
Line 46, delete "toughened" and replace with --roughened--.

Column 6,
Line 16, delete the equation and replace with -- $\int_{A_1} \sigma_{x1} dA_1 + \int_{A_2} \sigma_{x2} dA_2 = 0$ --;

Line 19, delete the equation and replace with -- $M = \int_{A_1} \sigma_{x1} y dA_1 + \int_{A_2} \sigma_{x2} y dA_2$ --;

Line 29, delete the equation and replace with -- $I_1 = \int_{A_1} y^2 dA \; ; \; I_2 = \int_{A_2} y^2 dA$ --;

Column 7,
Line 7, delete " toughened" and replace with --roughened--.
Line 20, delete "beam. The" and replace with --beam, the--.

Replace formal drawing sheet 3 with corrected formal drawing sheet 3.

Signed and Sealed this

Fourteenth Day of August, 2001

*Attest:*

*Attesting Officer*

NICHOLAS P. GODICI
*Acting Director of the United States Patent and Trademark Office*

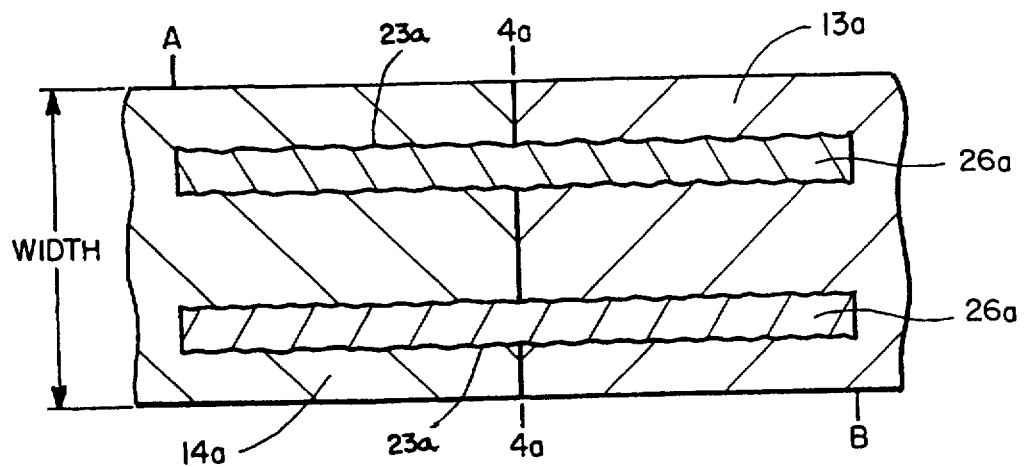
FIG_5
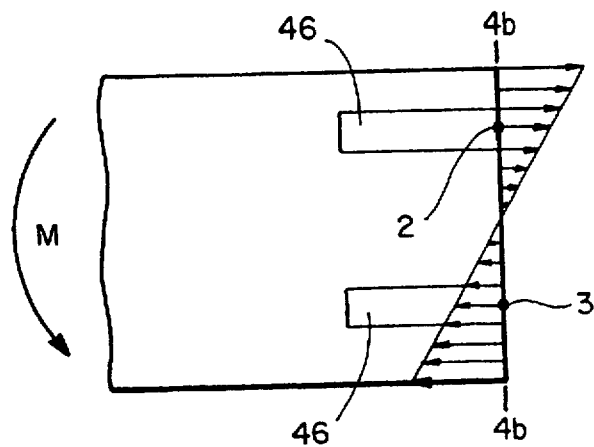
FIG_6
(PRIOR ART)